United States Patent Office 3,336,380
Patented Aug. 15, 1967

3,336,380
BORON CHELATES OF 1-AMINO-7-IMINO-
1,3,5-CYCLOHEPTATRIENES
Earl L. Muetterties, West Chester, Pa., assignor to E. I. du Pont de Nemours and Company, Wilmington Del., a corporation of Delaware
No Drawing. Filed July 1, 1963, Ser. No. 292,078
6 Claims. (Cl. 260—551)

This invention relates to certain new boron chelates and to a process for their preparation.

The chelates of 1-amino-7-imino - 1,3,5-cyclohepta-trienes with certain metals have been described in U.S. Patent 3,052,705 to Brasen and Howard. All of the chelates disclosed in this patent are non-ionic in character, i.e., they are inherently complexes in which the number of ligand molecules and negative ions, if any, bound to the metal atom is such that all of the primary (ionic) valences of the metal are satisfied within its coordinated sphere and that the complex retains no ionic charge, either positive or negative. The chelates are therefore neutral species, and they are substantially insoluble in water.

The reaction products of 1-amino-7-imino-1,3,5-cyclo-heptatrienes with certain boron compounds have been described in U.S. Patent 3,068,272 to Holmquist. These products are trisubstituted borines. The patent suggests the possibility that a coordinate nitrogen-boron bond may be present, but in any event the described products are neutral species and contain only one 1-amino-7-inimo-1,3,5-cycloheptatriene nucleus per boron atom.

It has now been found that the 1-amino-7-imino 1,3,5-cycloheptatrienes are capable of forming with boron positively charged chelates which are isolated as salts characterized by solubility in water and resistance to hydrolysis.

The new products of this invention are boron complexes of the general formula

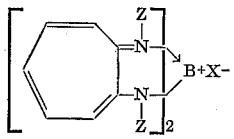

where X is an anion and Z is hydrogen, an aliphatically saturated hydrocarbon radical of 1 to 10 carbons, or such a radical bearing halo, nitro, sulfo, lower alkoxy and lower dialkylamino substituents.

These compounds are prepared by a one- or two-step process which comprises:

(a) bringing in contact in an aprotic organic solvent a boron trihalide B(Hal.)$_3$, where Hal. stands for chlorine or bromine, with a 1-amino - 7 - imino-1,3,5-cyclo-heptatriene having hydrogen on the amino nitrogen, whereby there is spontaneous formation of an ionic chelate in which the anion is Cl$^-$ or Br$^-$, as the case may be, according to the equation

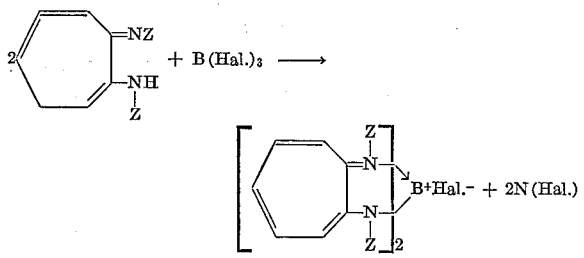

where Z has the previously stated significance; and (b) if a different chelate salt is desired, bringing in contact in aqueous solution the above chloride or bromide chelate with a salt of a strong base and an acid whose anion is other than chloride or bromide, whereby metathesis occurs to give a chelate of the same structure but where the chloride or bromide anion is replaced by new anion.

In the first step of this process, there can be used as the ligand-forming reactant any of the 1-amino-7-imino-1,3,5-cycloheptatrienes corresponding to the formula shown in the above equation, such as those described in U.S. Patents 3,052,705 and 3,068,272 already referred to. These starting materials include those in which Z in the above formula is hydrogen; an aliphatically saturated hydrocarbon radical of 1 to 10 carbon atoms, for example alkyl such as methyl, ethyl, propyl, n-butyl, n-octyl, n-decyl; cycloalkyl such as cyclohexyl; aryl such as phenyl, naphthyl; aralkyl such as benzyl, phenylethyl; alkaryl such as tolyl, xylyl; and the substituted derivatives thereof, particularly such hydrocarbon radicals having a lower alkoxy, lower dialkylamino, nitro, halo or sulfo substituent, for example, p-methoxyphenyl, ethoxyethyl, p-dimethylaminophenyl, diethylaminoethyl, p-nitrophenyl, p-chlorophenyl, p-sulfophenyl, and the like. Aryl in the above radical is carbocyclic. The preferred starting materials, for reasons of accessibility and cost, are those in which the groups attached to the nitrogen atoms are hydrogen, lower alkyl, phenyl or substituted phenyl.

The relative proportions of the boron trihalide and the 1-amino-7-imino-1,3,5-cycloheptatriene are not critical, since a complex containing two ligand molecules per atom of boron forms regardless of the initial reactant ratio. However, for more complete utilization of the reactants and easier recovery of the reaction products, it is preferred to use approximately two moles of 1-amino-7-imino-1,3,5-cycloheptatriene per mole of boron trichlorodie or tribromide.

In view of the sensitivity of boron trichloride and tribromide to water, hydroxylated compounds or protonic compounds in general, the chelate-forming reaction is conducted in an adrotic liquid medium which dissolves the reactants to at least some extent, e.g., 5% by weight. An aprotic solvent, as defined in Remick's "Electronic Interpretations of Organic Chemistry" (1943), pages 456–457, is one which neither gives up nor takes up protons to an appreciable degree. The suitable solvents may also be defined as those in which any hydrogen atoms present are bound solely to carbon atoms. Preferred solvents include aromatic hydrocarbons or halohydrocarbons, such as benzene, toluene, the xylenes, chlorobenzene; aliphatic halohydrocarbons such as methylene chloride, chloroform, trichloroethylene, tetrachloroethylene, sym.-tetra-chlorodifluoroethane; nitriles such as acetonitrile; ethers such as di-n-butyl ether, dioxane, tetrahydrofuran; etc. An acid acceptor to neutralize the hydrogen halide formed, such as a tertiary amine, e.g., pyridine, triethylamine, may be present but this is by no means essential.

The chelate-forming reaction is spontaneous and exothermic. Thus, application of heat is not necessary, although mild heating to complete the reaction and expel the hydrogen halide can be used if desired. There is therefore no critical reaction temperature, and the external temperature may be, for example, in the range of —20° C. to 100° C.

The resulting ionic chelate often precipitates from the solution as it forms. If this does not take place, it can be isolated by evaporation of the solvent. These chelates are crystalline solids which may be purified, if necessary, by recrystallization from water or from mixtures of water and a miscible organic solvent such as methanol, ethanol, acetone or acetonitrile.

From these initially obtained chelates, in which the anion is Cl$^-$ or Br$^-$, other chelate salts containing any desired anion can be prepared by simple methathesis in an aqueous medium. The term "anion" refers, of course, to that charge atom or group which, when combined with protonic hydrogen, forms a compound which, in aqueous solution, has a pH not higher than that of water.

This metathetical reaction is most conveniently effected simply by bringing in contact in a preponderantly aqueous solution (water alone or mixtures of water with an ionizing water-soluble organic solvent such as a lower alkanol) the chelate obtained in the initial step of the process and at least an equimolar amount of a salt of a strong base (dissociation constant of at least $1 \times 10^{-5}$) and the acid whose anion is desired. The cation in this salt may be, for example, an alkali metal (preferably sodium or potassium), ammonium, or alkylammonium such as tetramethylammonium tetraethylammonium, dimethylammonium, isopropylammonium, tributylammonium, etc. The nature of the anion is immaterial. It can be inorganic or organic, monovalent or polyvalent. Thus, for example, the anion may be iodide, fluoride, cyanide, hydroxy, nitrate, nitrite, sulfate, sulfite, chlorate, phosphate, monohydrogen phosphate, carbonate, sulfide, chromate, borohydride, acetate, trichloroacetate, trifluoroacetate, butyrate, acrylate, methacrylate, crotonate, dodecanoate, stearate, cyclohexanoate, benzoate, toluate, picrate, benzene sulfonate, fluorobenzoate, benzene phosphonate, benzenearsenate, anthranilate, glycinate, etc. It may also be a complex anion such as tetrathiocyanatodiammino chromate or ferricyanide. Further, it may be the anion formed by a strong pi acid reducible to an anion-radical, such as tetracyanoquinodimethane. The preferred anions are the monovalent inorganic anions and the monovalent organic anions containing from 1 to 12 carbon atoms.

This reaction takes place at temperatures as low as 0° C. or even lower. It can be accelerated by warming the aqueous solution but it is in general unnecessary to exceed a temperature of about 100° C.

The separation of the resulting ionic chelate is based on the solubility differences between it and the salt formed concomitantly. With proper selection of the cation and anion in the non-chelate reactant, a solubility differential will always exist. In the majority of cases, the salt formed is more soluble in water than the chelate formed and the latter precipitates, if necessary after concentration of the solution. Less frequently, the salt will precipitate first, or may be caused to do so by addition of a water-miscible organic solvent such as methanol, ethanol or acetone. Selective solubility in an appropriate organic solvent may also be employed to effect or complete the separation.

This metathetical reaction can also be applied to chelates having anions other than Cl− or Br−, after such chelates have been prepared as described above, so that it is possible, if desired, to exchange anions at will.

A variation of the anion-exchange reaction involves the use of the well-known ion-exchange resins. This procedure is valuable for the preparation of highly water-soluble chelates, and it can also be used to exchange anions other than Cl− or Br−. For example, a solution of a chelate $L_2B^+X^-$ (L representing the 1-amino-7-imino-1,3,5-cycloheptatriene ligand) in water or an ionizing solvent such as a lower alkanol can be passed through a column containing the hydroxy ion form of an ion exchange resin to yield a solution of the $L_2B^+OH^-$ chelate. Addition to this solution of an equivalent amount of a salt of a volatile base, e.g., $NH_4^+X^-$ or $(CH_3)_3NH^+X^-$ or of an acid $H^+X^-$, where $X^-$ is the anion to be introduced, following by evaporation to dryness, will yield the desired chelate $L_2B^+X^-$. As another example, a solution of a chelate $L_2B^+X^-$ can be passed through a column containing the sulfonic, carboxylic or chloride form of an ion exchange resin, with resultant anion exchange.

The ionic boron chelates of 1-amino-7-imino-1,3,5-cycloheptatrienes are yellow to orange colored crystalline solids. They are characterized by extraordinary stability toward hydrolytic agents. No decomposition occurs when these compounds are treated with boiling water or boiling dilute acids or alkalies, even on prolonged contact. These chelates are also highly stable to atmospheric conditions. This behavior is remarkable and unexpected since ionic chelates of boron with other ligands such as acetylacetone are known to be rapidly decomposed by water and atmospheric moisture.

The following examples illustrate the invention.

*Example I*

A solution of 2.5 g. (0.01 mole) of boron tribromide in 20 ml. of chloroform was rapidly added to a solution of 2.9 g. (0.02 mole) of 1-methylamino-7-methylimino-1,3,5-cycloheptatriene in 80 ml. of benzene. Heat was evolved and a yellow precipitate of bis(1-methylamino-7-methylimino - 1,3,5 - cycloheptatrieno)boron bromide separated. The slurry was heated to reflux for one hour while bubbling nitrogen through it to drive off the hydrogen bromide, and the solvents were then evaporated.

The residual bromide chelate was dissolved in a minimum of water containing a little methanol and to this solution was added a saturated aqueous solution of ammonium hexafluorophosphate. This resulted in the separation of bis(1 - methylamino - 7-methylimino-1,3,5-cycloheptatrieno)boron hexafluorophosphate as a semi-solid which crystallized after a period of warming on the steam bath and addition of a little methanol. This chelate was recrystallized twice from a hot methanol-water mixture to give yellow crystals melting at 238° C. with decomposition.

*Analysis.*—Calcd. for $(C_9H_{11}N_2)_2B^+PF_6^-$: C, 48.0; H, 4.9; P, 6.9; B, 2.4. Found: C, 46.7; H, 5.0; P, 7.2; B, 2.6.

The chelate underwent no decomposition when its solution in 5% aqueous sulfuric acid was heated to the boiling point, as shown by the fact that its ultraviolet spectrum remained unchanged after this treatment and that the ultraviolet spectrum of the solution did not show any of the characteristic absorptions of the initial ligand material, 1 - methylamino - 7 - methylimino-1,3,5-cycloheptatriene. The chelate was equally stable in boiling aqueous 5% sodium hydroxide, as shown by the same tests.

*Example II*

A solution of bis(1-methylamino-7-methylimino-1,3,5-cycloheptatrieno)boron hexafluorophosphate in methanol was passed through an ion exchange column containing the chloride form of a commercial polystyrene ion exchange resin. The eluate was evaporated to dryness, leaving a yellow solid residue (2.4 g.) of the chloride chelate, bis(1 - methylamino - 7-methylimino-1,3,5-cycloheptatrieno)boron chloride.

This chelate was dissolved in water and to the solution was added an aqueous solution of 0.316 g. (slight molar excess) of sodium borohydride. This caused separation of a yellow precipitate of the borohydride chelate, bis-(1 - methylamino-7-methylimino-1,3,5-cycloheptatrieno)-boron borohydride, M.P. 125° C.

*Analysis.*—Calcd. for $(C_9H_{11}N_2)_2B^+BH_4^-$: C, 67.6; H, 8.0; N, 17.5; B, 6.8. Found: C, 65.9; H, 8.2; N, 17.0; B, 6.5.

*Example III*

Gaseous boron trichloride was bubbled through a benzene solution of 1-methylamino-7-methylimino-1,3,5-cycloheptatriene. The temperature rose to about 42° C. during this addition, which was continued until the temperature began to drop, and a yellow solid separated. Excess boron trichloride was removed under reduced pressure, and the mixture was filtered. Infrared analysis of the yellow solid showed that it was a mixture of the amine hydrochloride with bis(1-methylamino-7-methylimino-1,3,5-cycloheptatrieno)boron chloride.

The foregoing examples are to be considered as illustrative rather than limitative, since the described procedures are broadly applicable to the preparation, from any 1-amino-7-imino-1,3,5-cycloheptatriene, of ionic boron chelates in which the anion is any desired one.

Additional examples of chelates obtainable by the described process are shown in the following list, in which the first column names the ligand-forming compound and the second column gives the formula of the anion.

| Ligand-forming Compound | Anion |
|---|---|
| 1-amino-7-imino-1,3,5-cycloheptatriene | $F^-$ |
| 1-phenylamino-7-phenylimino-1,3,5-cycloheptatriene. | $NO_3^-$ |
| 1-ethylamino-7-ethylimino-1,3,5-cycloheptatriene. | $CN^-$ |
| 1-cyclohexylamino-7-cyclohexylimino-1,3,5-cycloheptatriene. | $CF_3COO^-$ |
| 1-(2-methoxyethylamino)-7-(2-methoxyethylimino)-1,3,5-cycloheptatriene. | $PO_4^-$ |
| 1-propylamino-7-propylimino-1,3,5-cycloheptatriene, ring dichlorinated. | $CH_3C_6H_4COO^-$ |
| 1-(p-dimethylaminophenylamino)-7-(p-dimethylaminophenylimino)-1,3,5-cycloheptatriene. | $C_6H_5SO_3^-$ |
| 1-(n-decylamino)-7-(n-decylimino)-1,3,5-cycloheptatriene. | $OH^-$ |
| 1-(2,5-dimethylphenylamino)-7-(2,5-dimethylphenylimino)-1,3,5-cycloheptatriene. | $C_6H_5COO^-$ |
| 1-amino-7-imino-1,3,5-cycloheptatriene | $CH_3(CH_2)_{16}COO^-$ |
| 1-benzylamino-7-benzylimino-1,3,5-cycloheptatriene. | $I^-$ |
| 1-naphthylamino-7-naphthylimino-1,3,5-cycloheptatriene. | $CH_3(CH_2)_2COO^-$ |
| 1-(p-chlorophenylamino)-7-(p-chlorophenylimino)-cycloheptatriene, ring monosulfonated. | $SO_4^-$ |
| 1-(p-methoxyphenylamino)-7-(p-methoxyphenylimino)-1,3,5-cycloheptatriene. | $CrO_4^-$ |
| 1-(n-butylamino)-7-(n-butylimino)-1,3,5-cycloheptatriene, ring monobrominated. | $Cr(SCN)_4(NH_3)_2^-$ |
| 1-(p-sulfophenylamino)-7-(p-sulfophenylimino)-1,3,5-cycloheptatriene. | $CCl_3COO^-$ |
| 1-amino-7-imino-1,3,5-cycloheptatriene | $CH_3(CH_2)_{10}COO-SO_3^-$ |
| 1-(p-nitrophenylamino)-7-(p-nitrophenylimino)-1,3,5-cycloheptatriene. | |
| 1-(butoxymethylamino)-7-(butoxymethylimino)-1,3,5-cycloheptatriene. | $CH_3COO^-$ |
| 1-amino-7-imino-1,3,5-cycloheptatriene, ring dibrominated. | $F-C_6H_4COO^-$ |
| 1-(2-methylphenylamino)-7-(2-methylphenylimino)-1,3,5-cycloheptatriene. | $NO_2^-$ |
| 1-cyclopentylamino-7-cyclopentylimino-1,3,5-cycloheptatriene. | $CO_3^-$ |
| 1-(3,5-dibromophenylamino)-7-(3,5-dibromophenylimino)-1,3,5-cycloheptatriene. | $ClO_4^-$ |

The preferred compounds of this invention are those ionic chelates in which the anion is $Cl^-$ or $Br^-$, since they are obtained directly from the corresponding metal tetrahalide and are the precursors of the other ionic chelates.

By virtue of the fact that the described chelates are all colored, they are generically useful as water-soluble dyes. Their high stability toward hydrolysis and oxidation makes them useful in particular as dyes for antifreeze compositions used in the cooling system of internal combustion engines, and as dye markers for use in water or on snow or ice.

The products of this invention are further generically useful as test reagents for ink eradicators, by virtue of the fact that they give a color test when in contact with the oxidizing agents present in these materials. This property was shown as follows: Strips of paper were impregnated with a dilute aqueous/methanol solution of bis(1 - methylamino - 7 - methylimino-1,3,5-cycloheptatrieno)boron chloride, and allowed to dry. Upon touching the paper with representative ink removing materials, viz, dilute aqueous potassium permanganate, dilute aqueous sodium hypochlorite, and a commercial ink eradicator, colored spots appeared at the points of contact (brown, light yellow brown and yellow brown, respectively). The other chelates of this invention give similar color tests. This property makes the products of this invention useful for the detection or prevention of forgery or alterations by erasure in such written documents as bank checks, ledgers, wills, letters, notebooks and the like. The inherent color of the chelates is not a disadvantage in this use since many business records such as checks or invoices are often themselves produced in color.

Additionally, the ionic chelates of this invention in which the anion is small and/or forms readily soluble salts, e.g., $Cl^-$ or $Br^-$, are useful as scavengers or sequestering agents for large anions such as $Fe(CN)_6^\equiv$, $AsF_6^-$, $SbF_6^-$, etc., since they remove such anions from solutions containing them through the described anion exchange reaction.

As many widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A boron chelate of the formula

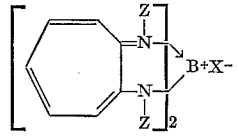

wherein X is an anion and Z is a radical selected from the group consisting of alkyl of up to 10 carbons, cycloalkyl of up to 10 carbons, methoxyethyl, ethoxyethyl, diethylaminoethyl, butoxymethyl, carbocyclic aryl, alkaryl and aralkyl of up to 10 carbon atoms and substituted carbocyclic aryl, alkaryl and aralkyl of up to 10 carbons substituted in the para position with a member of the group consisting of halo, nitro, sulfo, lower alkoxy and lower dialkylamino.

2. A compound of claim 1 wherein X is an inorganic anion.

3. A boron chelate of the formula

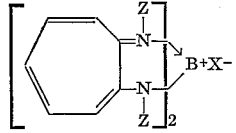

wherein X represents halogen and Z is lower alkyl.

4. Bis(1-methylamino-7-methylimino-1,3,5-cycloheptatrieno)boron bromide.

5. Bis(1-methylamino-7-methylimino-1,3,5-cycloheptatrieno)boron hexafluorophosphate.

6. Bis(1-methylamino-7-methylimino-1,3,5-cycloheptatrieno)boron borohydride.

References Cited

UNITED STATES PATENTS 3,068,272  11/1962  Holmquist _____ 260—462

OTHER REFERENCES

Houben-Weyl, Methodern der Organischen Chemie, Band 6/2, p. 234.

Dilthey et al., Liebigs Annelen der Chemie, 344, 326–335, (1905).

WALTER A. MODANCE, *Primary Examiner.*

HARRY I. MOATZ, *Assistant Examiner.*